US008059552B2

(12) United States Patent
Yu et al.

(10) Patent No.: US 8,059,552 B2
(45) Date of Patent: Nov. 15, 2011

(54) APPARATUS AND METHOD FOR EFFICIENTLY TRANSMITTING/RECEIVING A CONTROL CHANNEL IN A MOBILE COMMUNICATION SYSTEM SIMULTANEOUSLY SUPPORTING A SYNCHRONOUS HRPD SYSTEM AND AN OFDM SYSTEM

(75) Inventors: Jae-Chon Yu, Suwon-si (KR); Dong-Hee Kim, Yongin-si (KR); Jin-Kyu Han, Seoul (KR); Yu-Chul Kim, Seoul (KR); Hwan-Joon Kwon, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 954 days.

(21) Appl. No.: 11/728,372

(22) Filed: Mar. 26, 2007

(65) Prior Publication Data

US 2007/0253320 A1 Nov. 1, 2007

(30) Foreign Application Priority Data

Mar. 24, 2006 (KR) .................. 10-2006-0027180

(51) Int. Cl.
*H04L 12/26* (2006.01)

(52) U.S. Cl. ..................................... 370/252

(58) Field of Classification Search .................. 370/208, 370/203, 229, 235, 310, 328–330, 336, 338, 370/341, 343, 345, 349, 351, 430, 431, 436, 370/442–444, 458, 464, 478, 480, 498, 241, 370/252; 455/500, 507, 509, 513, 515, 522, 455/91, 115.1, 115.3, 127.1, 127.4, 130, 455/142, 143, 344
See application file for complete search history.

(56) References Cited

U.S. PATENT DOCUMENTS

| | | | |
|---|---|---|---|
| 2003/0026219 A1* | 2/2003 | Moon et al. ................... 370/318 |
| 2003/0185159 A1 | 10/2003 | Seo et al. |
| 2003/0224775 A1* | 12/2003 | Suda et al. ................. 455/422.1 |
| 2005/0128973 A1 | 6/2005 | Yagihashi |
| 2005/0270969 A1* | 12/2005 | Han et al. ....................... 370/210 |
| 2005/0283715 A1* | 12/2005 | Sutivong et al. .............. 714/790 |
| 2006/0268789 A1 | 11/2006 | Yu et al. |

FOREIGN PATENT DOCUMENTS

WO  WO 2005/062490  7/2005

* cited by examiner

*Primary Examiner* — Derrick Ferris
*Assistant Examiner* — Omar Ghowrwal
(74) *Attorney, Agent, or Firm* — The Farrell Law Firm, P.C.

(57) ABSTRACT

An apparatus and method for efficiently transmitting/receiving a control channel in a mobile communication system simultaneously supporting a synchronous High-Rate Packet Data (HRPD) system and an Orthogonal Frequency Division Multiplexing (OFDM) system. Power of a control channel to be transmitted is measured. The measured power is compared with marginal maximum power set by a higher layer. According to the comparison result, information indicating whether a previous reverse packet has been successfully received and power control information for controlling power of a reverse link is inserted and transmitted in at least one of a Medium Access Control (MAC) channel and an OFDM symbol.

6 Claims, 10 Drawing Sheets

APPARATUS AND METHOD FOR EFFICIENTLY TRANSMITTING/RECEIVING A CONTROL CHANNEL IN A MOBILE COMMUNICATION SYSTEM SIMULTANEOUSLY SUPPORTING A SYNCHRONOUS HRPD SYSTEM AND AN OFDM SYSTEM

This application claims priority under 35 U.S.C. §119(a) to a Korean Patent Application filed in the Korean Intellectual Property Office on Mar. 24, 2006 and assigned Ser. No. 2006-27180, the disclosure of which is incorporated herein by reference.

BACKGROUND OF THE INVENTION

1. Field of the Invention

The present invention generally relates to an apparatus and method for transmitting/receiving data in a multicarrier High-Rate Packet Data (Nx HRPD) system, and more particularly to an apparatus and method for efficiently transmitting/receiving a control channel in a mobile communication system simultaneously supporting a synchronous HRPD system and an Orthogonal Frequency Division Multiplexing (OFDM) system.

2. Description of the Related Art

With the rapid development of communication technologies, mobile communication systems can provide not only the conventional voice service but also a high-rate data service in which large-volume digital data such as E-mails, still images, moving images, and the like can be transmitted to mobile terminals.

Representative examples of current mobile communication systems for providing high-rate data services are EVolution Data Only (EV-DO) and OFDM systems, and the like. To provide a forward transmission rate of about 2.4 Mbps, the EV-DO system has evolved from the conventional Code Division Multiple Access (CDMA) 2000 1× corresponding to one of the high-rate data service standards proposed by Qualcomm, a company in the United States. The EV-DO system is called a High-Rate Packet Data (HRPD) system.

A representative wireless mobile communication system using a multicarrier transmission scheme is an OFDM transmission scheme. The OFDM transmission scheme parallel converts a serially input symbol stream, modulates parallel symbols in multiple subcarriers orthogonal to each other, and transmits the modulated symbols. With the development of Very Large Scale Integration (VLSI) technologies after the early 1990's, OFDM transmission systems have began to come into the spotlight.

Since an OFDM transmission scheme modulates data using multiple subcarriers and maintains orthogonality between the multiple subcarriers, the OFDM transmission scheme is more robust to a frequency selective multipath fading channel as compared with an existing single carrier modulation scheme. The OFDM transmission scheme is suitable for high-rate packet data services such as a broadcast service and the like.

Next, a slot structure and a transmitter structure in a Forward Link (FL) of a conventional HRPD system will be briefly described.

FIG. 1 shows slot structure of the FL in the conventional HRPD system. A half slot is repeated within one slot in which data is transmitted in the FL of the HRPD system. $N_{pilot}$-chip pilot signals 101 are inserted into the centers of the half slots and are used for channel estimation of the FL in a receiver of a mobile terminal. $N_{MAC}$-chip Medium Access Control (MAC) signals 102 and 103 including reverse power control information and resource allocation information are transmitted on both sides of the pilot signals 101. $N_{Data}$-chip data 104 and 105 are transmitted on both sides of the MAC signals 102 and 103. The FL slot in the HRPD system is multiplexed in a Time Division Multiplexing (TDM) scheme in which pilot signals, MAC information, data, and the like are transmitted at different times.

On the other hand, the MAC information is multiplexed in a CDMA scheme using Walsh codes. In the FL of the HRPD system, a unit size of each pilot signal block is set to $N_{pilot}=96$ chips, a unit size of each MAC signal block is set to $N_{MAC}=64$ chips and a unit size of each data block shown in FIG. 1 is set to $N_{Data}=400$ chips.

FIG. 2 shows a transmitter structure of the FL in the conventional HRPD system. The transmitter is constructed with a channel encoder 201 for channel encoding received packet data, a channel interleaver 202 for interleaving the encoded packet data, and a modulator 203 for modulating the interleaved packet data. Data of a MAC channel passes through a channel encoder 205. A TDM multiplexer (MUX) 206 multiplexes pilot signals, MAC signals and data into a physical link of the slot structure as shown in FIG. 1. Data output from the TDM MUX 206 is transmitted to a mobile terminal through a carrier modulator 207 and an antenna (not shown). In FIG. 2, reference numeral 208 denotes an HRPD compatible processor compatible with a multicarrier HRPD (Nx HRPD) system. The HRPD compatible processor 208 includes the MAC channel encoder 205, the TDM MUX 206 and the carrier modulator 207.

FIG. 3 shows a packet transmission relation between an FL and a Reverse Link (RL) in the conventional HRPD system. Specifically, FIG. 3 shows structures of forward and reverse slots according to reverse packet transmission in legacy Rev. A and B systems. An RL subpacket 300 is included and transmitted in four slots in the legacy system supporting a high-rate packet service.

In terms of the forward slots mapped to the reverse slots, ACKnowledged/Non-ACKnowledged (ACK/NACK) information indicating whether the RL subpacket 300 has been successfully received is allocated to three slots. Also, Power Control Bit (PCB) information for ensuring a channel state of the RL subpacket 300 is allocated and transmitted in one slot.

In other words, in the legacy HRPD Rev. A and B systems, a terminal transmits the RL subpacket 300 to a base station in the four slots. The base station allocates the NACK information indicating when the reception of the RL subpacket 300 has failed or the ACK information indicating when the reception of the RL subpacket 300 has succeeded, to an ACK/NACK field in three slots of the FL. The base station allocates and transmits the PCB information in one slot. The ACK/NACK and PCB information is transmitted in an existing MAC channel.

However, the legacy HRPD Rev. A and B systems may not sufficiently support efficient use of frequency resources and broadband data transmission used by a next-generation system. A scheme for efficiently transmitting control information according to broadband data transmission should be embodied in the next-generation system.

SUMMARY OF THE INVENTION

The present invention addresses at least the above problems and/or disadvantages and provides at least the advantages described below. Accordingly, an aspect of the present invention is to provide an apparatus and method that transmit and receive a control channel in a mobile communication system simultaneously supporting a synchronous HRPD system and an OFDM system.

Another aspect of the present invention is to provide an apparatus and method that transmit control information for a reverse packet in an OFDM symbol in a mobile communication system for simultaneously transmitting the OFDM symbol and an EV-DO symbol.

Still another aspect of the present invention is to provide an apparatus and method that transmit and receive information indicating whether a reverse packet has been successfully received and power control information in a unit of one slot.

In accordance with an aspect of the present invention, there is provided an apparatus for transmitting packet data in a forward link of an HRPD system, the apparatus including a transmitter for modulating physical layer packet data to be transmitted into a radio signal in a predefined transmission scheme and transmitting the modulated signal to a wireless network; a power measurer for measuring a power amount to be used for a control channel of a slot in which the radio signal is transmitted; and a selection controller for comparing the measured power amount to be used in the slot with predefined marginal maximum power of the control channel and selecting a physical channel on which the control information based on a previously received reverse packet is transmitted.

In accordance with another aspect of the present invention, there is provided a method for transmitting packet data in a forward link of an HRPD system, the method including measuring power of a control channel to be transmitted; comparing the measured power with marginal maximum power set by a higher layer; and allocating information indicating whether a previous reverse packet has been successfully received and power control information for controlling power of a reverse link to at least one of a MAC channel and an OFDM channel according to a comparison result.

In accordance with still another aspect of the present invention, there is provided ah apparatus for receiving packet data in a forward link of an HRPD data system, the apparatus including a MAC/OFDM selector for performing a selection control operation so control information is selectively extracted from at least one of a specific MAC channel and a specific OFDM symbol according to a transmission scheme of a radio signal; and a detector for detecting the control information from an associated channel using selection information applied from the selector.

In accordance with yet another aspect of the present invention, there is provided a method for receiving packet data in a forward link of an HRPD data system, the method including checking a transmission scheme of a physical channel for transmitting a radio signal from a higher layer; detecting control information from at least one of a specific MAC channel and a specific OFDM symbol of a received slot according to the transmission scheme; demodulating the detected control information; and controlling a reverse packet to be transmitted later using the demodulated control information.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in below with reference to the accompanying drawings. Descriptions of well-known functions and constructions are omitted for clarity and conciseness.

A High-Rate Packet Data (HRPD) system for transmitting high-rate packet data is defined before the present invention is described. To support an HRPD service, a synchronous mobile communication system to which the present invention is applied is developing into an HRPD Rev. A system, an HRPD Rev. B system and an HRPD Rev. C system.

Figure 1:
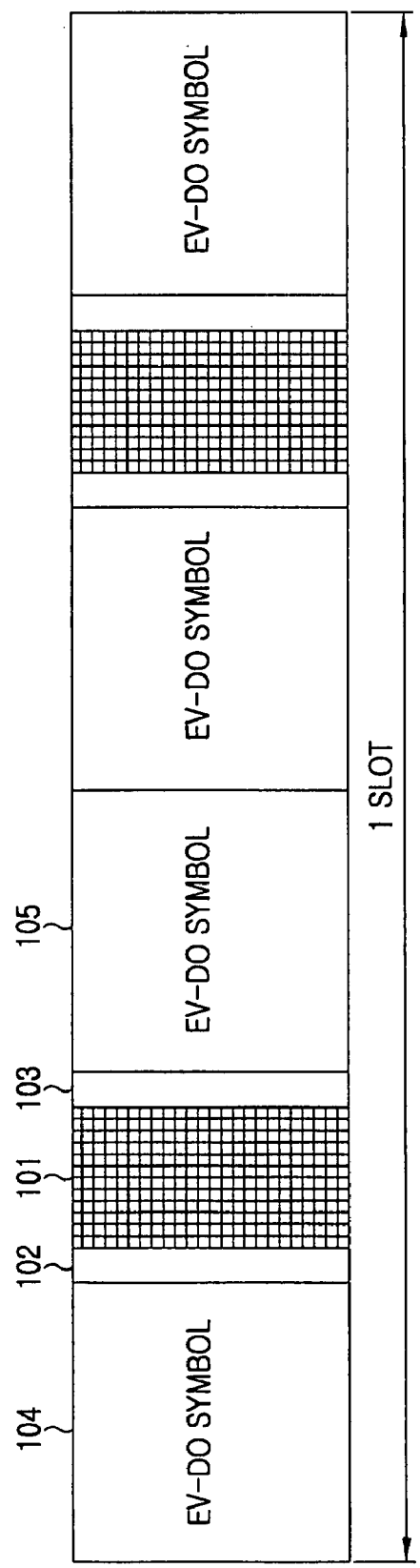
FIG. 1 illustrates a structure of a forward slot in a system supporting a conventional HRPD service.
Figure 2:
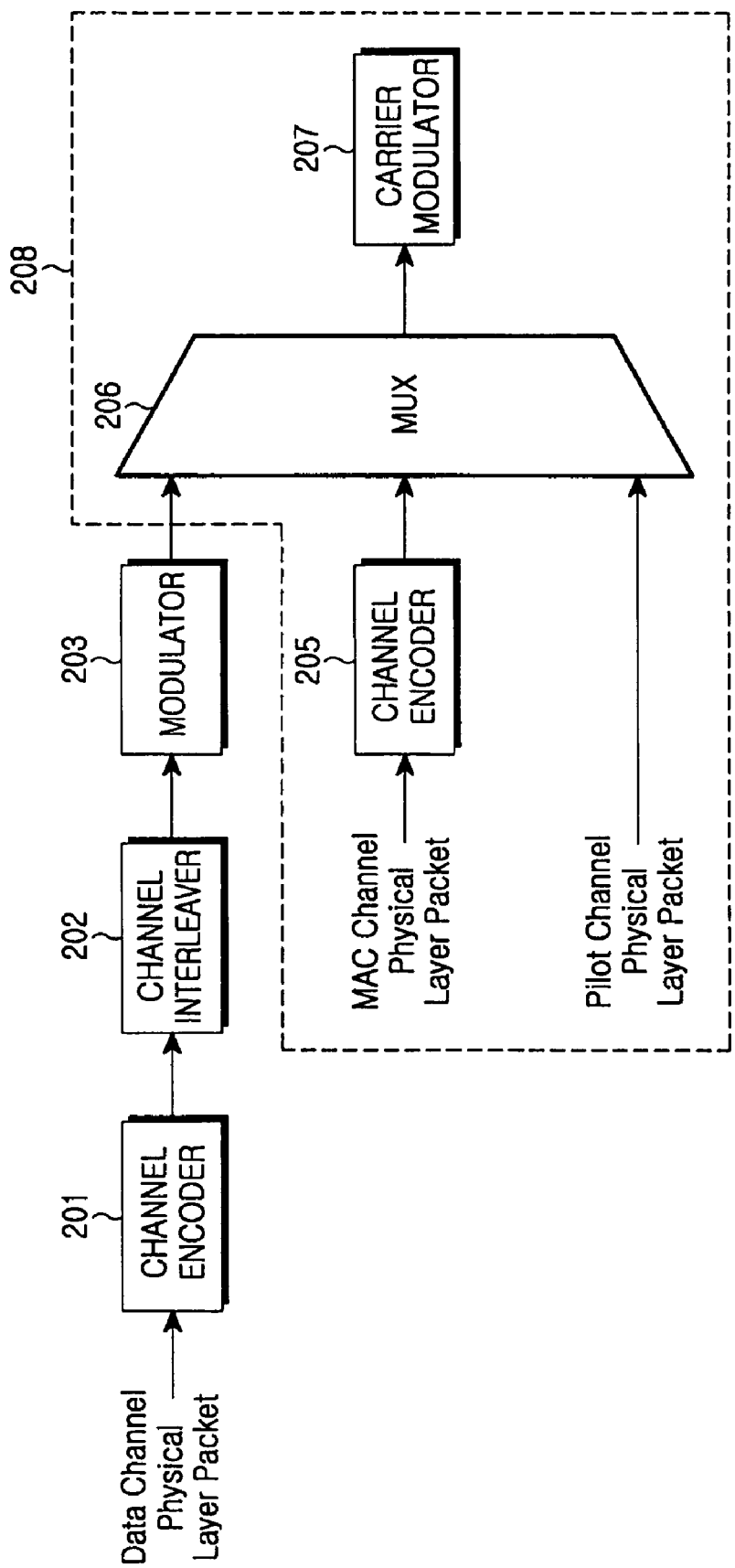
FIG. 2 illustrates a structure of a transmitter in a conventional HRPD system.
Figure 3:
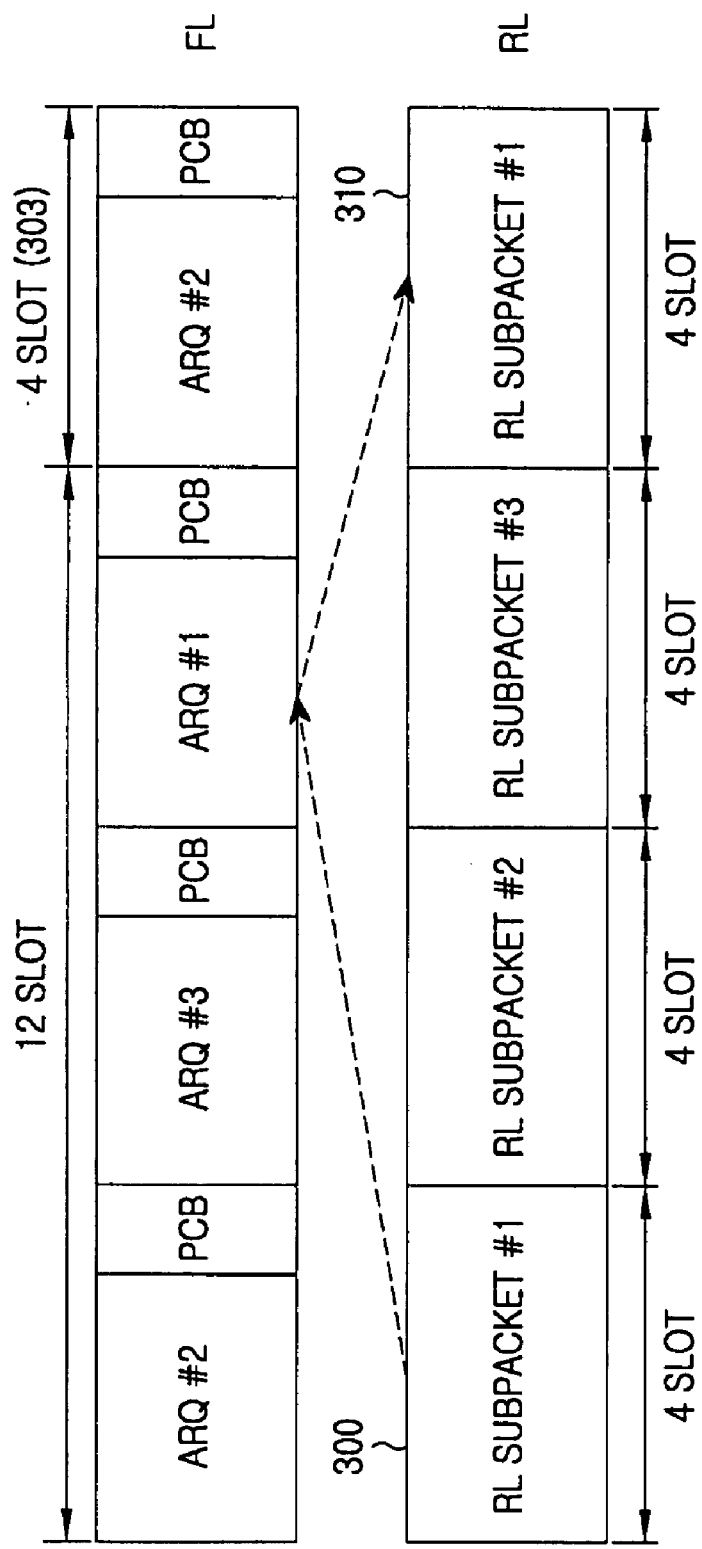
FIG. 3 illustrates an ACK/NACK and PCB) information transmission relation of a forward link according to reverse packet transmission in a conventional HRPD system.

First, the HRPD Rev. A system is a Code Division Multiple Access (CDMA) system for transmitting/receiving a packet using one carrier. That is, an arbitrary terminal transmits and receives forward and reverse packets using a physical channel allocated to one frequency band. A slot structure of the HRPD Rev. A system is the same as shown in FIG. 1.

The HRPD Rev. B system is a CDMA system for transmitting/receiving a packet using a maximum of three carriers. In the slot structure as shown in FIG. 1, a packet service is performed using the maximum of three carriers. This means that the HRPD Rev. B system supports a high-rate packet service in a more advanced form than that of the HRPD Rev. A system.

The HRPD Rev. A and B systems transmit only an EVolution Data Only (EV-DO) symbol on a data channel of a carrier allocated, as shown in FIG. 1.

On the other hand, a multicarrier HRPD (Nx HRPD) system according to the present invention is called the HRPD Rev. C system that can perform a high-speed, large-capacity packet transmission with multiple carriers in a maximum band of 5 MHz. There is an advantage in that the Nx HRPD system enables high-speed, large-capacity packet communication incapable of being supported in the HRPD Rev. A and B systems. The Nx HRPD system can simultaneously transmit and receive an orthogonal Frequency Division Multiplexing (OFDM) symbol and an EV-DO symbol using multiple carriers in the maximum band of 5 MHz. Therefore, the Nx HRPD system can meet service demands of users.

For example, the present invention can transmit forward and reverse packets using a minimum of five carriers in the maximum band of 5 MHz.

Figure 4:
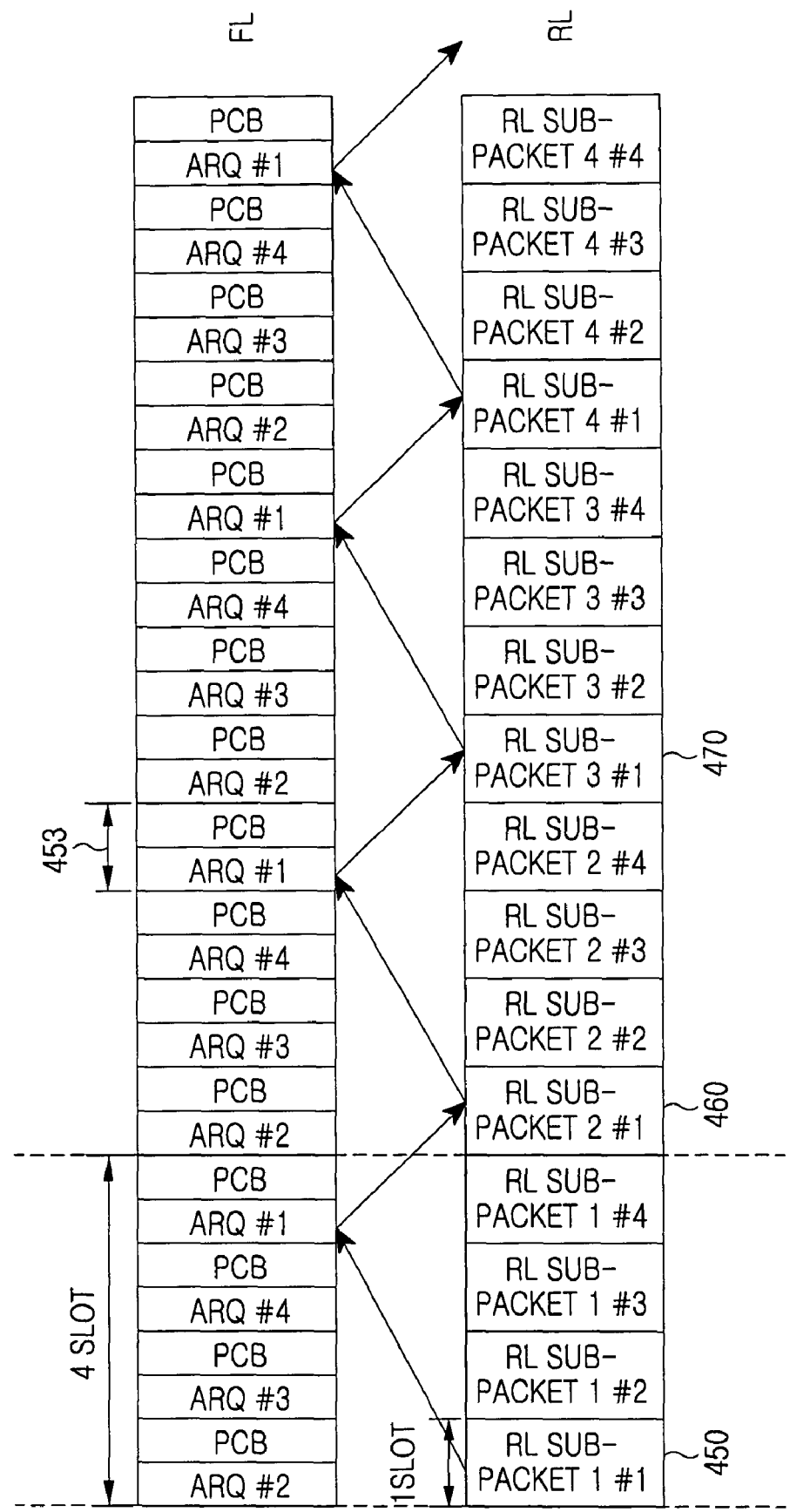
FIG. 4 illustrates an ACK/NACK and PCB information transmission relation of a forward link according to reverse packet transmission in an HRPD system in accordance with the present invention.

FIG. 4 shows slot structures of a Forward Link (FL) and a Reverse Link (RL) in the Nx HRPD system in accordance with the present invention. The HRPD Rev. C system provides a service using the smaller number of slots than that of the RL used in the legacy HRPD Rev. A/B system.

The legacy HRPD Rev. A/B system transmits and receives data and control information using a minimum of four slots, whereas the Nx HRPD system transmits an RL subpacket 450 in one slot.

In response to the RL subpacket 450, a base station allocates and transmits ACKnowledged/Non-ACKnowledged (ACK/NACK) information indicating whether the RL subpacket 450 has been successfully received and PCB information for ensuring a channel state in a total of one slot.

Since processing power of the base station is improved, the HRPD Rev. C system can transmit the ACK/NACK and PCB information in one slot. Thus a time to demodulate the transmitted packet can be shortened and a symbol length of the ACK/NACK information corresponding to response information for the demodulated transmitted packet can be reduced. The HRPD Rev. C system can increase an amount of data capable of being transmitted in the same time, that is, transmission capacity.

When receiving the RL subpacket 450 in one slot, the base station allocates the ACK/NACK information indicating whether the RL subpacket 450 has been successfully received and PCB information for maximally ensuring a channel state of the RL to one slot 453 and then transmits the information to a terminal.

The terminal determines re-transmission while considering the ACK/NACK information transmitted in the forward direction. The terminal re-transmits a previously transmitted packet in the RL in response to the NACK information or transmits a new packet in the RL in response to the ACK information.

Figures 5A, 5B, 5C:
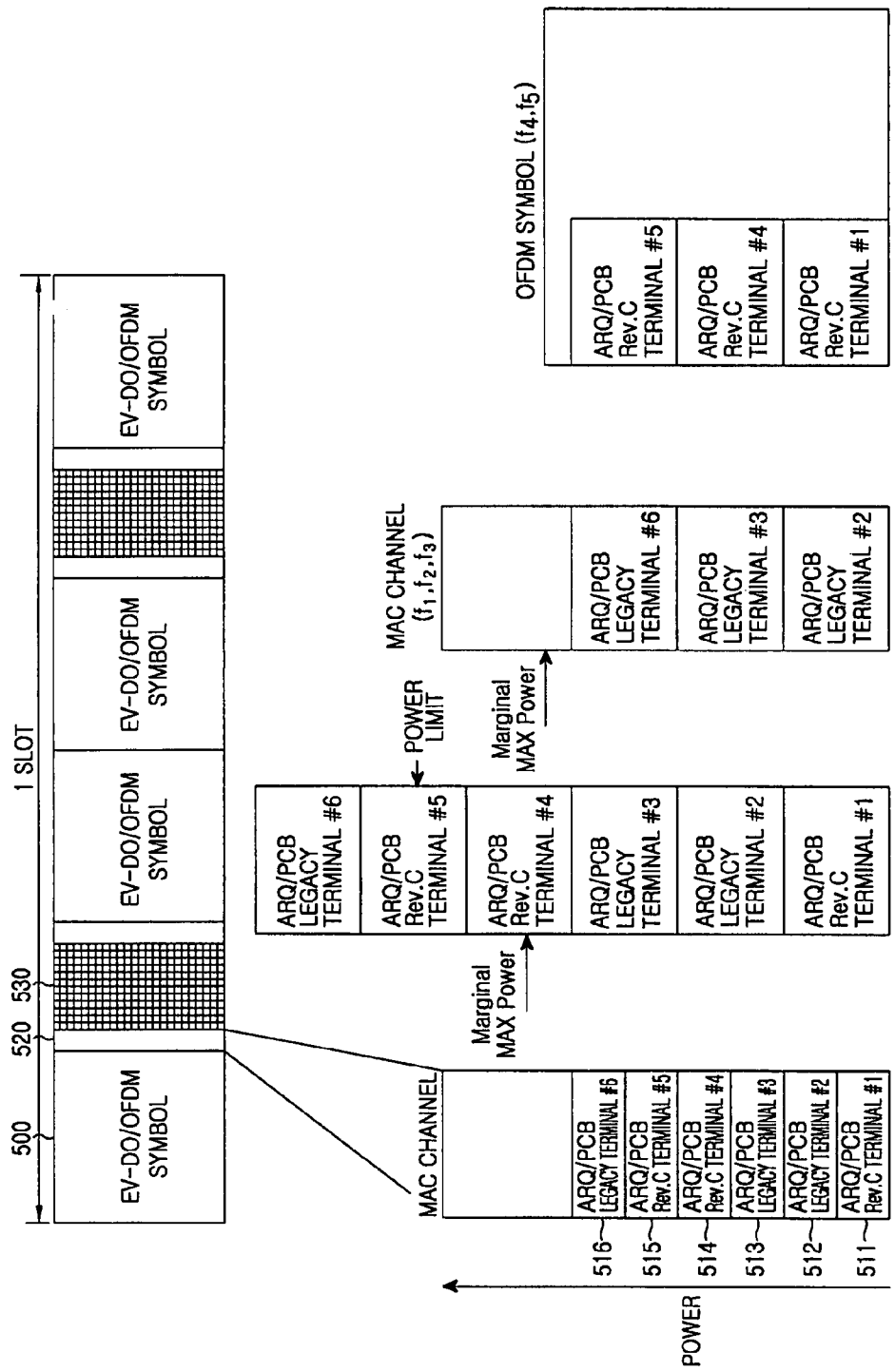
FIGS. 5A, 5B and 5C illustrate a slot structure of a forward link for transmitting the ACK/NACK and PCB information in multiple carriers in accordance with the present invention.

FIGS. 5A-5C show a slot structure of a Forward Link (FL) in accordance with the present invention. The Nx HRPD system can select and transmit an OFDM symbol and an EV-DO symbol in a data field 500. In the present invention, a MAC channel 520 includes ACK/NACK information and PCB information as MAC information. A pilot channel 530 includes pilot information for estimating an FL channel.

The MAC channel 520 includes control information for multiple terminals and is used to transmit the ACK/NACK information and the PCB information for a reverse data packet from each of the multiple terminals.

As the number of slots in a reverse data packet transmission interval is reduced to one in order to achieve a high-speed, high-capacity packet transmission, the system of the present invention should transmit the ACK/NACK information on the MAC channel in one slot by allocating higher power than that at which the legacy HRPD system transmits the ACK/NACK information in three slots.

The system of the present invention in which the ACK/NACK information is transmitted in one slot can achieve the same performance as the legacy system in which the ACK/NACK information is transmitted in three slots.

In other words, the MAC channel in one slot includes information supporting a reverse control channel for multiple terminals 511, 512, 513, 514, 515, and 516 as shown in FIG. 5A. A probability that the lack of power will occur is higher in the MAC channel of the system compared with that of the legacy HRPD Rev. A/B system.

Therefore, the present invention provides a scheme for transmitting the MAC channel at higher power than that of the legacy HRPD Rev. A/B system. To transmit the MAC channel for multiple terminals in one slot, that is, to address the problem of the lack of power of the MAC channel, the present invention provides a scheme capable of transmitting the MAC channel using an OFDM symbol for HRPD Rev. C terminals as shown in FIG. 5C when power of the MAC channel exceeds marginal maximum power as shown in FIG. 5B.

In FIG. 5C, a base station of the HRPD Rev. C system of the present invention can communicate in an environment in which HRPD Rev. A/B terminals and HRPD Rev. C terminals co-exist.

The HRPD Rev. A/B terminals can detect a MAC channel transmitted in one carrier or a maximum of three carriers. On the other hand, the HRPD Rev. C terminals can detect multiple carriers in a maximum band of 5 MHz, thereby detecting an OFDM symbol.

That is, the HRPD Rev. C terminals can detect all carriers of at least f1, f2, f3, f4, and f5. The HRPD Rev. C terminals can simultaneously detect MAC channels of f1, f2, and f3 and all OFDM symbols of f4 and f5.

In the present invention, the base station allocates ACK/NACK and PCB information for the legacy terminals 516, 513, and 512 to a MAC channel. Also, the base station allocates a MAC channel for the HRPD Rev. C terminals 515, 514, and 511 so power of the MAC channel does not exceed a marginal maximum power. When the power of the MAC channel exceeds the marginal maximum power, the HRPD Rev. C system includes and transmits the ACK/NACK and PCB information for the HRPD Rev. C terminals 515, 514, and 511 in specific OFDM symbols of OFDM-dedicated carriers of f4 and f5. In the present invention, FIG. 5C shows an example in which the ACK/NACK and PCB information for the HRPD Rev. C terminals is transmitted in an OFDM symbol corresponding to the MAC channel under consideration of a marginal maximum power state.

The MAC channel is allocated for the HRPD Rev. C terminals at the marginal maximum power set under consideration of the maximum power state in order to prevent the lack of power of the MAC channel 520 when control information for the HRPD Rev. C terminals 515, 514, and 511 is allocated to the MAC channel and control information for the legacy system's terminals 516, 513, and 512 is additionally allocated to the MAC channel. Thus, the base station periodically checks whether the power of the MAC channel 520 does not exceed the marginal maximum power.

A physical layer to be used between the base station and the terminals 511, 512, 513, 515, and 516 is set in a higher layer by referencing a power state of the MAC channel and is negotiated using a higher message.

Figure 6:
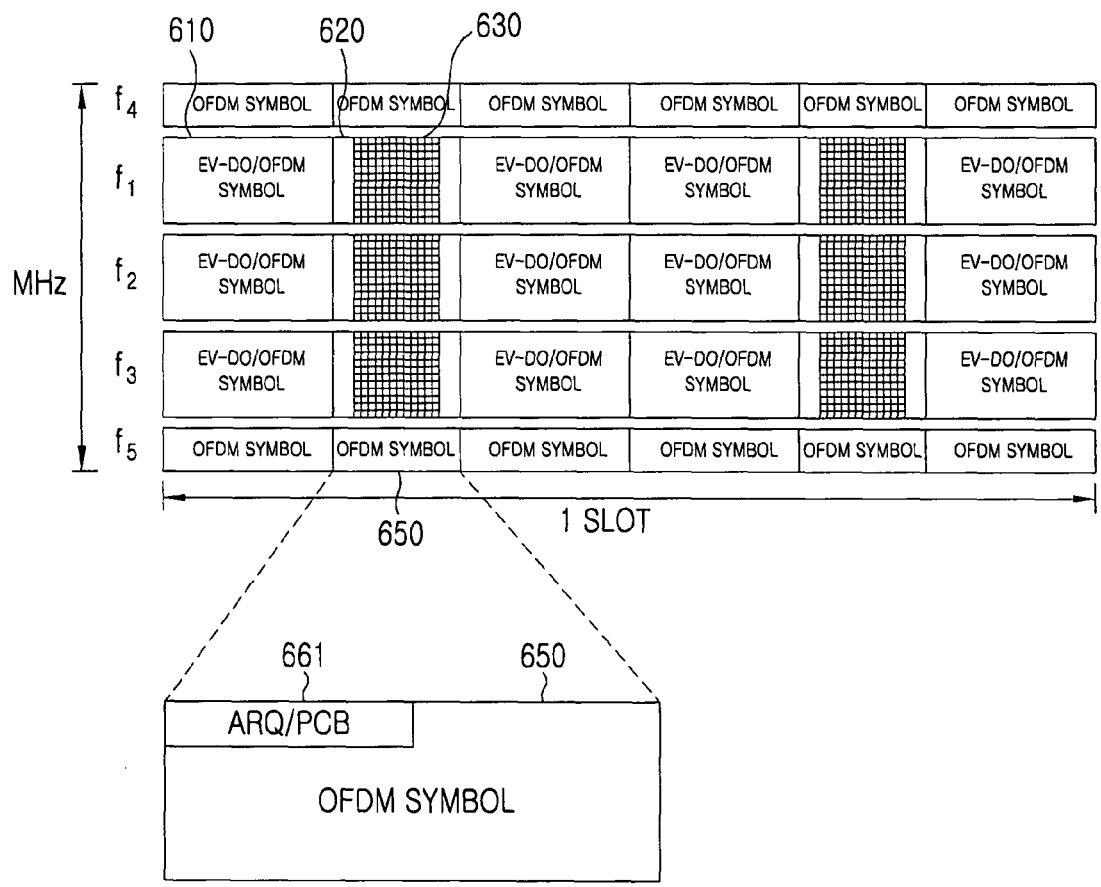
FIG. 6 illustrates a slot structure of a forward link for transmitting the ACK/NACK and PCB information in an OFDM-dedicated symbol in accordance with the present invention.

FIG. 6 shows a concept in which ACK/NACK and PCB information for HRPD Rev. C terminals is included and transmitted in OFDM symbols of OFDM-dedicated carriers f4 and f5 in accordance with the present invention. The HRPD Rev. C system of the present invention using a frequency band of 5 MHz includes three Nx HRPD compatible carriers f1, f2, and f3 and carriers f4 and f5 for transmitting dedicated OFDM symbols in a low frequency band.

When the base station allocates a MAC channel for multiple terminals in one slot, relatively high power is allocated to the MAC channel to ensure the reliability of ACK/NACK and PCB information for the terminals. If the power of the MAC channel exceeds the marginal maximum power, the base station first includes and transmits the ACK/NACK and PCB information for legacy terminals in the MAC channel and then inserts and transmits ACK/NACK and PCB information 651 for HRPD Rev. C terminals in the OFDM symbol.

That is, when the ACK/NACK and PCB information is inserted into the OFDM symbol based on a decision by a higher layer, the information is inserted into a dedicated OFDM symbol 650 corresponding to a pilot and MAC channel in an existing slot and is transmitted to the HRPD Rev. C terminals in the carriers f4 and f5.

Figure 7:
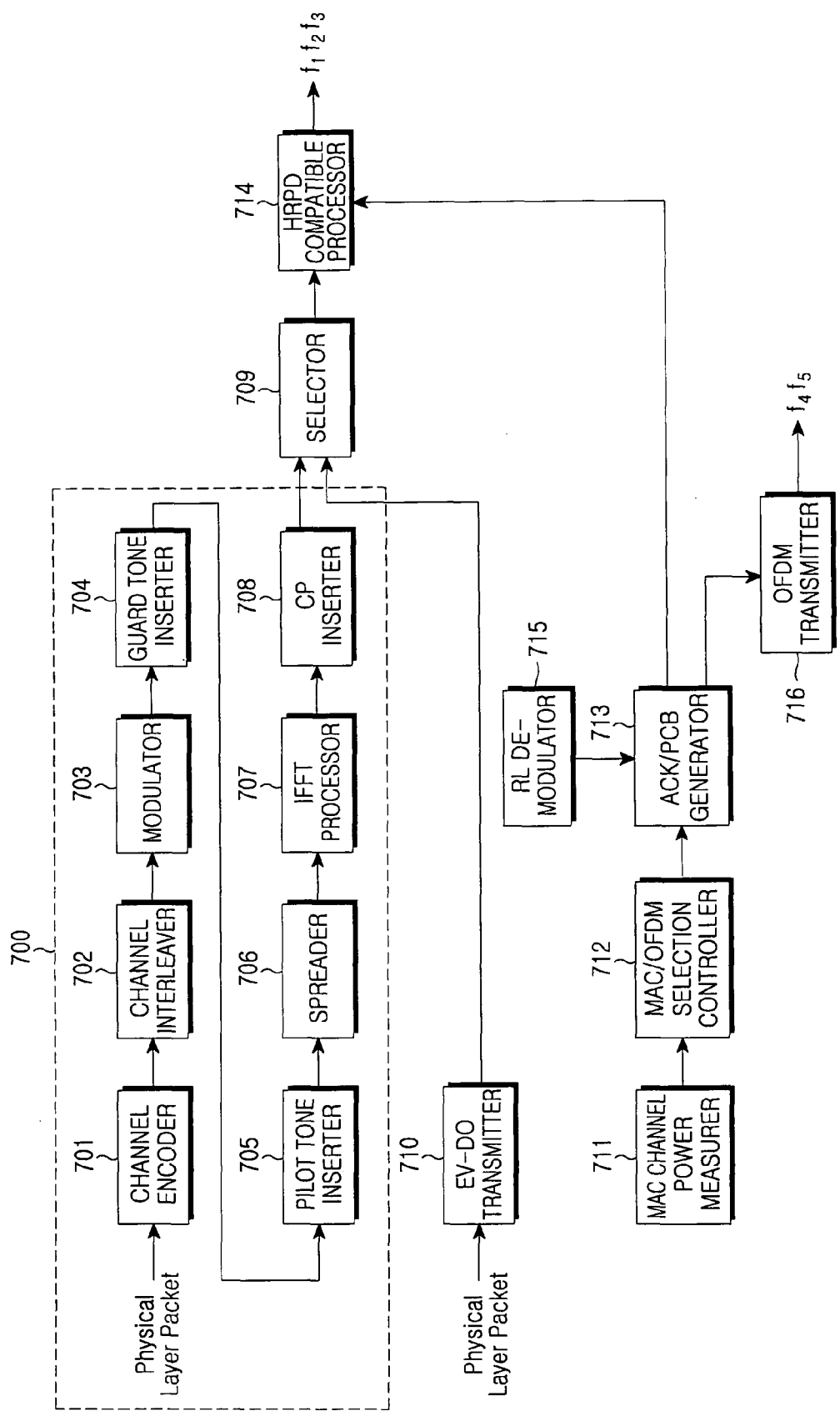
FIG. 7 illustrates a block diagram illustrating a structure of a transmitter for transmitting ACK/NACK and PCB information in accordance with the present invention.

FIG. 7 shows a structure of a transmitter in an Nx HRPD compatible system in accordance with the present invention. The transmitter can include a channel encoder 701 for channel encoding received packet data, a channel interleaver 702 for interleaving the encoded packet data, a modulator 703 for modulating the interleaved packet data, a guard tone inserter 704 for inserting guard tones to prevent out-of-band signals from serving as interference, and a pilot tone inserter 705 for inserting pilot tones.

The transmitter can further include a spreader 706, an Inverse Fast Fourier Transform (IFFT) processor 707 for transforming a frequency-domain signal into a time-domain signal, a Cyclic Prefix (CP) inserter 708 for inserting a CP at the beginning of OFDM data to prevent signal interference, an HRPD compatible processor 714 with a transmission scheme of an HRPD Rev. A/B system, an EV-DO transmitter 710, and a selector 709 for selecting EV-DO and OFDM transmission schemes in HRPD Rev. A/B. The spreader 706 can be implemented with, for example, a Quadrature Phase Shift Keying (QPSK) spreader.

The transmitter can further include a MAC channel power measurer 711 for measuring power of a MAC channel of a current slot, a selection controller 712 for determining whether to transmit ACK/NACK and PCB information in a MAC channel or OFDM symbol based on a measurement result of the power measurer 711, an ACK/NACK/PCB generator 713 for generating the ACK/NACK and PCB information using information acquired from an RL demodulator 715, and an OFDM transmitter 716 for inserting OFDM symbols into carriers f4 and f5 when the ACK/NACK and PCB information is transmitted in the OFDM symbols.

In the present invention, a transmission process of the base station for an OFDM or EV-DO transmission scheme is as follows.

Physical layer packet data generated from a higher layer is input to the channel encoder 701. The channel encoder 701 channel-encodes the packet data into a channel-encoded bit stream and then outputs the channel-encoded bit stream to the channel interleaver 702. The channel interleaver 702 interleaves the channel-encoded bit stream to achieve diversity gain. The modulator 703 modulates the interleaved bit stream to generate a modulated signal. The modulated signal is arranged in data tones of a data transmission interval (as indicated by reference numeral 500 of FIG. 5 and reference numeral 610 of FIG. 6). The guard tone inserter 704 arranges guard tones located at a band boundary of the signal output from the modulator 703. The pilot tone inserter 705 inserts only pilot signals so the pilot signals can be transmitted.

If signals to be transmitted are allocated to all tones according to the above-described operation, the spreader 706 performs, for example, QPSK spreading. Through this QPSK spreading process, signals of the base station for transmitting different information elements are multiplied by different complex Pseudo Noise (PN) streams. The complex PN stream is a complex stream in which all real and imaginary components are constructed with PN codes. The IFFT processor 707 arranges the QPSK-spread modulated signals in positions of target frequency tones through an IFFT process.

Then the CP inserter 708 inserts a CP into OFDM data processed in the IFFT process to prevent self-interference effect due to multipath fading, thereby generating an OFDM symbol. The above-described components can form one OFDM transmitter.

An EV-DO transmitter 710 allocates data to be transmitted to a data channel by encoding and modulating the data to be transmitted from the physical layer.

The selector 709 selects a signal according to OFDM or EV-DO transmission scheme and then outputs the selected signal to the HRPD compatible processor 714.

The MAC channel power measurer 711 measures a power amount to be used in a current slot and then outputs measurement information to a MAC/OFDM selection controller 712. The MAC channel power measurer 711 compares power to be used for transmission in the current slot with marginal maximum power. The MAC channel power measurer 711 outputs a power comparison result to the MAC/OFDM selection controller 712.

The MAC/OFDM selection controller 712 determines whether a target terminal for receiving control information corresponding to ACK/NACK and PCB information is the legacy system's terminal or a compatible Rev. C terminal after checking the power comparison result and compatibility with the terminal. If the target terminal is the legacy system's terminal, the operations of the OFDM transmitter and the compatible transmitter are controlled so Automatic Repeat Request (ARQ)/PCB information generated using information generated from the RL demodulator 715 can be allocated to the MAC channel. If the target terminal is the compatible terminal, the ARQ/PCB information is allocated to the MAC channel when the power of the current slot does not exceed the marginal maximum power. However, when the power of the current slot exceeds the marginal maximum power, the transmitters are controlled so the ARQ/PCB information is allocated to dedicated OFDM symbols of carriers f4 and f5. In the present invention, the transmitter transmits the ARQ/PCB information for multiple terminals in one slot.

Figure 8:
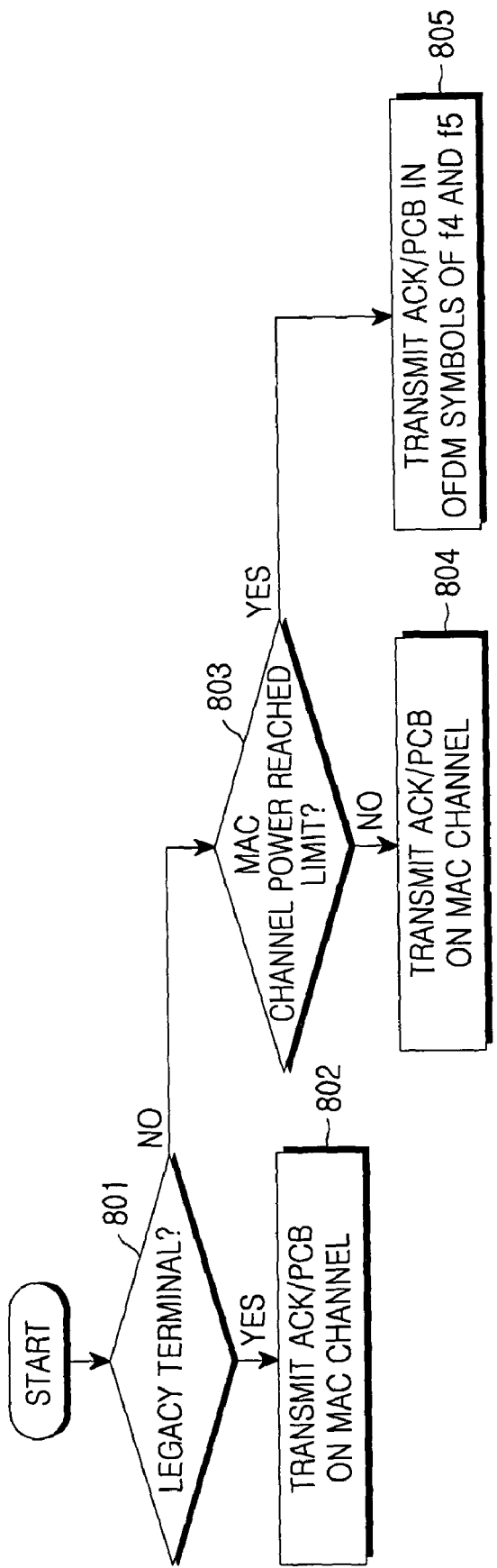
FIG. 8 is a flowchart illustrating a transmission process for inserting ACK/NACK and PCB information in accordance with the present invention.

FIG. 8 shows a process for efficiently transmitting ARQ/PCB information in an FL in accordance with the present invention. A transmitter determines whether a terminal supporting a service is an HRPD Rev. A/B terminal or an HRPD Rev. C terminal in step 801. If the terminal supporting the service is determined to be the HRPD Rev. A/B terminal, the process proceeds to step 802. In step 802, ACK/NACK and PCB information is allocated and transmitted in a MAC channel of the FL to which the present invention is applied. This is because the legacy system's terminal cannot receive carriers f4 and f5.

On the other hand, if the terminal supporting the service is determined to be the HRPD Rev. C terminal of the present invention, the process proceeds to step 803 to determine whether power of a current slot has reached a power limit. The power to be used in the current slot is compared with predefined marginal maximum power. If the power to be used has not reached the power limit, the process proceeds to step 804 to transmit the ACK/NACK and PCB information on the MAC channel. On the other hand, if the power to be used in the current slot has reached the power limit, the process proceeds to step 805 to transmit the ACK/NACK and PCB information in dedicated OFDM symbols of the carriers f4 and f5. The dedicated OFDM symbols correspond to the MAC channel.

Next, a structure of a receiver in accordance with the present invention will be described with reference to FIGS. 9 and 10.

Figure 9:
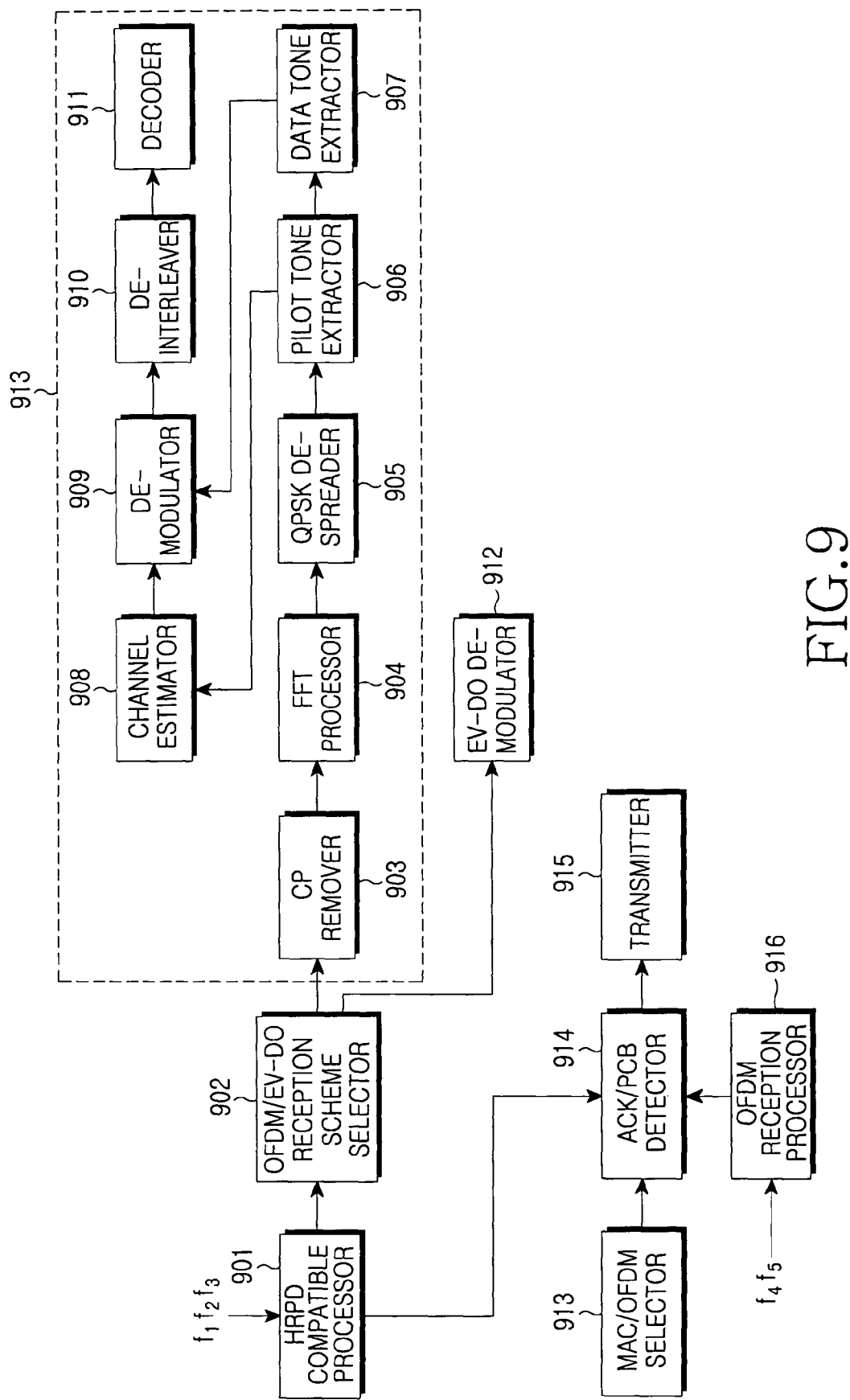
FIG. 9 is a block diagram illustrating a structure of a receiver for detecting ACK/NACK and PCB information in accordance with the present invention.

FIG. 9 shows a receiver for receiving ACK/NACK and PCB information in an FL of an Nx HRPD system in accordance with the present invention. An HRPD compatible processor 901 of the receiver receives multiple carriers f1, f2, and f3 and recovers a data channel, a MAC channel, and a pilot channel by TDM demultiplexing the HRPD compatible carriers f1, f2, and f3.

An OFDM/EV-DO reception scheme selector 902 determines whether a received signal is a signal transmitted in an OFDM or EV-DO transmission scheme. Since a process for determining whether packet data is the signal transmitted in the OFDM or EV-DO transmission scheme is not directly related to the present invention, a description is omitted. Upon determining that the signal is transmitted in the OFDM transmission scheme, the signal is output to a CP remover 903. The CP remover 903 removes a CP contaminated due to propagation delay, multipath delay, and the like from the received signal.

A Fast Fourier Transform (FFT) processor 904 transforms an input time-domain signal into a frequency-domain signal and then outputs the frequency-domain signal to a QPSK despreader 905. The QPSK despreader 905 QPSK-despreads the frequency-domain signal and then outputs tones of the QPSK-despread signal. This is because it is assumed that a QPSK-spread signal is transmitted from a transmitter. The receiver is provided with a despreader mapped to an associated spreader when a different spreading scheme is used in the transmitter.

The tones of the despread signal are output to a pilot tone extractor 906 and a data tone extractor 907. The data tone extractor 907 extracts data tones from the received signal.

On the other hand, a channel estimator 908 estimates a channel from a received pilot signal and then outputs a channel estimate to a demodulator 909. The demodulator 909 demodulates the data tones using the channel estimate and then outputs a demodulated signal to a deinterleaver 910. The deinterleaver 910 deinterleaves the demodulated signal and then inputs the deinterleaved signal to a decoder 911. The decoder 911 decodes the input signal to recover the originally transmitted signal.

In addition, the signal transmitted in the EV-DO transmission scheme is output and demodulated in an EV-DO demodulator 912. In accordance with the present invention, an OFDM reception processor 916 OFDM-demodulates signals f4 and f5 transmitted in the form of OFDM symbols.

A MAC/OFDM selector 913 detects a channel including ACK/NACK and PCB information using transmission scheme information of the ACK/NACK and PCB information transmitted in a higher message. An ACK/NACK/PCB detector 914 detects the ACK/NACK and PCB information according to transmission scheme selected for the channel provided from the MAC/OFDM selector 913. That is, the ACK/NACK/PCB detector 914 receives a channel from the HRPD compatible processor 901 and detects the ACK/NACK and PCB information when a channel including control information is a MAC channel according to EV-DO transmission scheme.

In the case of the OFDM symbol, the ACK/NACK and PCB information is detected from the carriers f4 and f5 received through the OFDM reception processor 916. A transmitter 915 controls a process for transmitting a reverse packet to be transmitted later using the detected ACK/NACK and PCB information.

Figure 10:
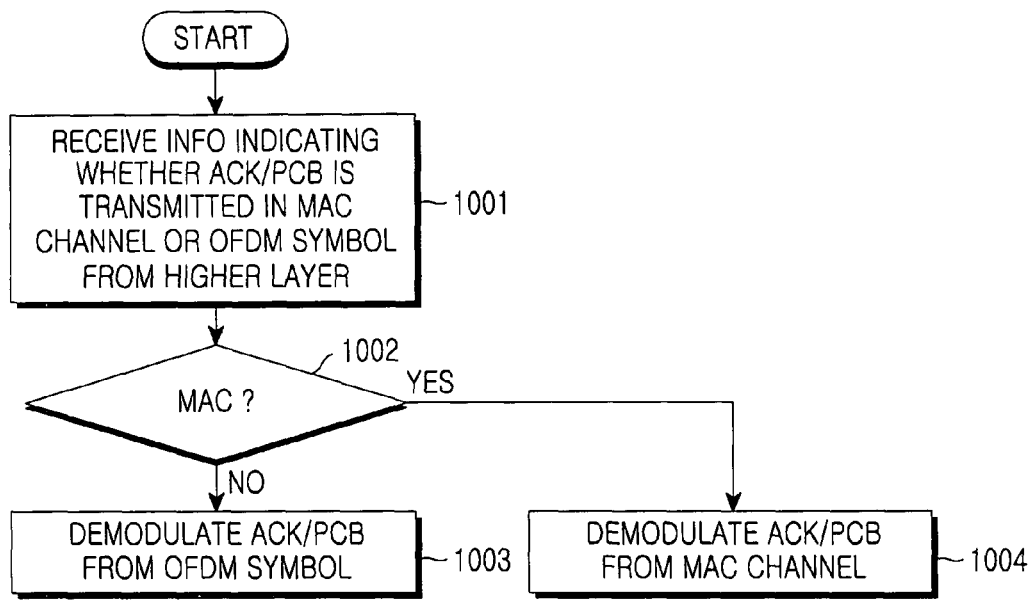
FIG. 10 is a flowchart illustrating a reception process for detecting ACK/NACK and PCB information of a forward link in accordance with the present invention.

FIG. 10 shows a reception process in an FL of the HRPD system in accordance with the present invention. The MAC/OFDM selector of the receiver receives transmission scheme information, regarding ACK/NACK and PCB information, transmitted in a message from a higher layer and receives information regarding a physical layer for transmitting the ACK/NACK and PCB information in step 1001. In step 1002, it is determined whether a received physical control channel is a MAC channel or an OFDM symbol. If the control channel including the control information is transmitted as the MAC channel, the ACK/NACK and PCB information is demodulated from the MAC channel in step 1004. On the other hand, if the ACK/NACK and PCB information is transmitted in the OFDM symbol, the ACK/NACK and PCB information is demodulated from the OFDM symbol in step 1003.

Although preferred embodiments of the present invention have been disclosed for illustrative purposes, those skilled in the art will appreciate that various modifications, additions, and substitutions are possible, without departing from the scope of the present invention. An example in which ACK/NACK and PCB information is included in OFDM symbols of f4 and f5 has been described. Of course, the ACK/NACK and PCB information can be arranged in various forms. Therefore, the present invention is not limited to the above-described embodiments, but is defined by the following claims, along with their full scope of equivalents.

As described above, the present invention can avoid the lack of power of a MAC channel in a multicarrier slot by inserting ACK/NACK and PCB information to be used in each carrier slot into an existing MAC channel and a newly added OFDM symbol in transmission technologies based on an OFDM transmission scheme and an EV-DO transmission scheme compatible with Nx HRPD. Therefore, the present invention can efficiently provide a high-rate packet service.

What is claimed is:

1. An apparatus for transmitting control information in a mobile communication system simultaneously supporting a synchronous high-rate packet data system and an Orthogonal Frequency Division Multiplexing (OFDM) system, the apparatus comprising:
   a power measurer for measuring power of a Medium Access Control (MAC) channel of a current slot; and
   a selection controller for comparing the measured power of the MAC channel with marginal maximum power and selecting the MAC channel or an OFDM symbol for transmitting control information for a terminal in one slot according to a comparison result; and
   a transmitter for transmitting the control information allocated to the MAC channel or the OFDM symbol to the terminal,
   wherein the selection controller selects the OFDM symbol for transmitting the control information for the terminal supporting an OFDM transmission scheme, when the measured power of the MAC channel exceeds the marginal maximum power, and
   wherein the selection controller selects the MAC channel for transmitting the control information, when the measured power of the MAC channel does not exceed the marginal maximum power.

2. The apparatus of claim 1, wherein the control information comprises at least one of a positive acknowledgement signal and a negative acknowledgement signal indicating whether a reverse packet has been successfully received and power control information of a channel on which a reverse packet is transmitted.

3. A method for transmitting control information in a multicarrier mobile communication system simultaneously supporting a synchronous high-rate packet data system and an Orthogonal Frequency Division Multiplexing (OFDM) system, the method comprising:
   measuring, by a power measurer, power of a Medium Access Control (MAC) channel of a current slot;

comparing, by a selection controller, the measured power of the MAC channel with marginal maximum power;

selecting, by the selection controller, the MAC channel or an OFDM symbol for transmitting control information for a terminal in one slot according to a comparison result; and transmitting, by a transmitter, the control information allocated to the MAC channel or the OFDM symbol to the terminal, wherein selecting comprises:

selecting the OFDM symbol for transmitting the control information for the terminal supporting an OFDM transmission scheme, when the measured power of the MAC channel exceeds the marginal maximum power and allocating the control information to the OFDM symbol, and selecting the MAC channel for transmitting the control information, when the measured power of the MAC channel does not exceed the marginal maximum power, and allocating the control information to the MAC channel.

4. The method of claim 3, wherein the control information comprises at least one of a positive acknowledgement signal and a negative acknowledgement signal indicating whether a reverse packet has been successfully received and power control information of a channel on which a reverse packet is transmitted.

5. An apparatus for receiving control information in a mobile communication system simultaneously supporting a synchronous high-rate packet data system and an Orthogonal Frequency Division Multiplexing (OFDM) system, the apparatus comprising:

a Medium Access Control (MAC)/OFDM selector for determining whether control information transmitted in a forward direction uses a MAC channel or an OFDM symbol; and a detector for detecting a reception response signal for a previously transmitted reverse packet and power control information of a channel on which a reverse packet is transmitted, from the MAC channel or the OFDM symbol selected by the MAC/OFDM selector, wherein the control information transmitted in the forward direction uses the OFDM symbol, when power of the MAC channel of a current slot exceeds marginal maximum power, and wherein the control information transmitted in the forward direction uses the MAC channel, when the power of the MAC channel does not exceed the marginal maximum power.

6. A method for receiving control information in a mobile communication system simultaneously supporting a synchronous high-rate packet data system and an Orthogonal Frequency Division Multiplexing (OFDM) system, the method comprising:

determining, by a Medium Access Control (MAC)/OFDM selector, whether control information transmitted in a forward direction uses a MAC channel or an OFDM symbol and detecting a reception response signal for a previously transmitted reverse packet and power control information of a channel on which a reverse packet is transmitted according to a determination result; and determining whether to transmit a new packet or re-transmit an identical packet according to the detected reception response signal for the reverse packet and controlling power of the channel on which the reverse packet is transmitted using the detected power control information, wherein the control information transmitted in the forward direction uses the OFDM symbol, when power of the MAC channel of a current slot exceeds marginal maximum power, and wherein the control information transmitted in the forward direction uses the MAC channel, when the power of the MAC channel does not exceed the marginal maximum power.

* * * * *